(12) United States Patent
Colussi et al.

(10) Patent No.: US 6,511,049 B2
(45) Date of Patent: Jan. 28, 2003

(54) AIR COOLER FOR INCLINED ROOF-TOPS

(75) Inventors: Rafael A. Colussi, Guadalupe Norte-Santa Fe (AR); Néstor J. Vénica, Guadalupe Norte-Santa Fe (AR)

(73) Assignee: Col-Ven S.A., Guadalupe Norte-Santa Fe (AR)

( * ) Notice: Subject to any disclaimer, the term of this patent is extended or adjusted under 35 U.S.C. 154(b) by 0 days.

(21) Appl. No.: 09/727,916

(22) Filed: Dec. 1, 2000

(65) Prior Publication Data

US 2002/0066968 A1 Jun. 6, 2002

(51) Int. Cl.[7] .................................................. B01F 3/04
(52) U.S. Cl. .................... 261/36.1; 261/66; 261/106; 261/DIG. 3; 261/DIG. 43; 454/157
(58) Field of Search ............................. 261/27, 29, 30, 261/36.1, 37, 66, 72.1, 102, 103, 105, 106, DIG. 3, DIG. 4, DIG. 43; 454/143, 151, 157

(56) References Cited

U.S. PATENT DOCUMENTS

| | | | |
|---|---|---|---|
| 3,294,376 A | * 12/1966 | Eranosian | 261/105 |
| 3,524,398 A | * 8/1970 | Winfrey | 261/30 |
| 3,606,982 A | * 9/1971 | Anderson | 261/DIG. 4 |
| 3,738,621 A | * 6/1973 | Anderson | 261/72.1 |
| 3,867,486 A | 2/1975 | Nagele | |
| 3,911,060 A | * 10/1975 | Bradley, Jr. et al. | 261/27 |
| 4,261,930 A | * 4/1981 | Walker | 261/DIG. 4 |
| 5,285,654 A | * 2/1994 | Ferdows | 261/103 |

FOREIGN PATENT DOCUMENTS

AR 0235114 7/1987

* cited by examiner

Primary Examiner—C. Scott Bushey
(74) Attorney, Agent, or Firm—Davidson, Davidson & Kappel, LLC

(57) ABSTRACT

A cooling unit includes a housing (1) with an evaporating unit (7) installed on the inclined roof of a cabin and an external water reservoir (29) with a rising pump (31) installed lower down, between the cabin and the rear part of a truck. The return hose (15') of the excess water gutter (45) coming from the evaporator has an upper end (14) connected to the front part of the gutter and then it crosses a rising stretch to leave by the rear part of the housing and descending down to its lower end which is connected at the outlet of the pump, together with the feed hose (6) of the evaporator by means of a coupling (47). The pump control is intermittent, with a duty cycle lower than 10%, sufficient to purge the return hose.

11 Claims, 3 Drawing Sheets

AIR COOLER FOR INCLINED ROOF-TOPS

FIELD OF THE INVENTION

This invention refers to the acclimation of truck cabins and could eventually be extended to other types of medium and long-distance freight transports, road building and agricultural machines and other means of locomotion. More particularly, it refers to an air cooler of the type which can be mounted on the roof of a cabin and is provided with an intake for external air to be cooled and circulated within the cabin.

Cooling is generally carried out by passing the air through a radiator/evaporator manufactured from a porous material which is kept moist, which fulfils the double function of a thermal exchanger, in taking heat from the air, and a moistener, which gives the sensation of the air having been cooled. The cabin is cooled by the lower temperature of the acclimated air and by the evaporation of moisture brought in with the air. This invention specifically refers to the moistening arrangement of the evaporator.

These cooler units are attractive due to their lower cost and maintenance compared with the traditional air conditioning units. Furthermore they do not consume power from the engine of the truck, which means operative economy in addition to not reducing the available power which the transport vehicle uses for its own locomotion. These coolers can also be adapted to other uses, such as transitory or precarious living quarters, for example, and workshops. The advantage in these static installations is that they avoid the use of compressors and electrical consumption.

BACKGROUND OF THE INVENTION

Coolers of the type described in the previous section are known on the market. These units have a water reservoir and a pump that circulates the water towards the evaporator in order to keep it moist. An electric fan passes the air from the intake towards the interior of the cabin, passing the air through the evaporator, where the air is cooled, giving up heat and absorbing moisture.

These units are commercially successful due to their simplicity and the previously stated advantages. Argentina Patent No. 235,114 and U.S. Pat. No. 3,867,486 describe coolers with those features.

FIG. 1 schematically illustrates a typical cooler unit which reflects, in general, the features of Argentina Patent No. 235,114. It is made in a plastic housing 1 having a front panel in the form of an air intake grid 12. The air is sucked in through a tubular evaporator 7 with a porous side-wall, the cooled air leaving through a gorge 11 made in the base of the housing into the cabin, through an orifice made in the roof. The moistening water comes from an external reservoir 29 and is fed, by means of a pump 31 and an 8-mm diameter hose 6, to a coil 5 within the housing 1 which doses it onto the wall of the evaporator 7. The return water precipitates on the bottom of a gutter 14, where it is collected for returning to the reservoir 29 by means of a 13-mm diameter descending hose 15, one end of which is connected to the rear part of the cooler unit and the other end of which penetrates approximately 20 mm into the reservoir 29 through the top thereof.

Modern trucks are designed taking special care on the aerodynamics of their external shape, as they are faster than their predecessors and must economize fuel consumption. To this effect, the roofs of new cabins slope forwards and downwards, in order to enhance penetration and reduce drag. These modern lines mean that when mounting a cooler as the one previously mentioned, the cooler should also be inclined forwards, in line with the sloped roof.

A disadvantage in installing coolers in units with forwardly sloping roof-tops is returning the excess water collected from the evaporator gutter to the reservoir, since the gutter becomes inclined with the roof-top such that the return hose in the rear part is at a higher level than the gutter rather than permanently descending (see, for reference, the important note on page 11 of the installation manual of the VIESA cooler). Aesthetic reasons and interference with the external air intake discourage the alternative of placing the return hose such that it exits through the front of the cooler unit. In the case of U.S. Pat. No. 3,867,486, the reservoir is housed within the cooler housing; however, the problem subsists due to the fact that the recirculation hose is not connected to the lower part of the reservoir.

Therefore, installers currently have two viable options in order to solve this inconvenience. The first and simplest one is to raise the front part of the unit, which aerodynamically and aesthetically puts it out of line. The other option is to add a second pump in order to overcome the difference in level and pump the water back. This second solution implies the addition of another component, which affects the cost and maintenance, specially taking into account the fact that the attractiveness of these units lies in their simplicity and economy.

SUMMARY OF THE INVENTION

Therefore, an object of this invention is to resolve efficiently and aesthetically the problem of water return in cooler units installed on sloped cabin roofs.

Another object of the invention is to provide a water return system without additional pumps in coolers installed sloping downwards away from the return hose entry.

Another object of the invention is to enhance the circulation of the return water towards the rear part of the cooler without lifting up the front part of the cooler from its natural position along the line of the cabin roof.

This invention achieves these and other objects and advantages which will become apparent in the ensuing specification, in an ingenious manner by disconnecting the return hose from the top-wall of the water reservoir and reconnecting it to the outlet of the pump, in parallel with the feed hose which keeps the evaporator moist. The pump suitably operates intermittently on the basis of a predetermined duty cycle to maintain the evaporator wet within the practical limits of moisture. The diameter of the return hose, which is actually or effectively smaller than the diameter of the hose feeding the coil, is dimensioned so that each on-cycle of the pump will be enough to purge it with a minimal entry of water into the gutter.

Preferably, the duty cycle of the pump is lower than 10%, more preferably 1:12, approximately. In this way, in each on-cycle, the pump supplies a greater volume flow of water from the reservoir to the coil through the larger hose to moisten the evaporator efficiently and a lesser volume flow of water towards the gutter but sufficient to purge the smaller return hose, so that the former will siphon return water from the gutter towards the reservoir during the idle cycles of the pump.

In addition to solving the stated problem efficiently, this invention has the advantage that it does not require modification to the cooler and likewise is applicable to models of existing units by changing the return hose and its connection on one side of the reservoir.

PREFERRED EMBODIMENT OF THE INVENTION

Figure 1:
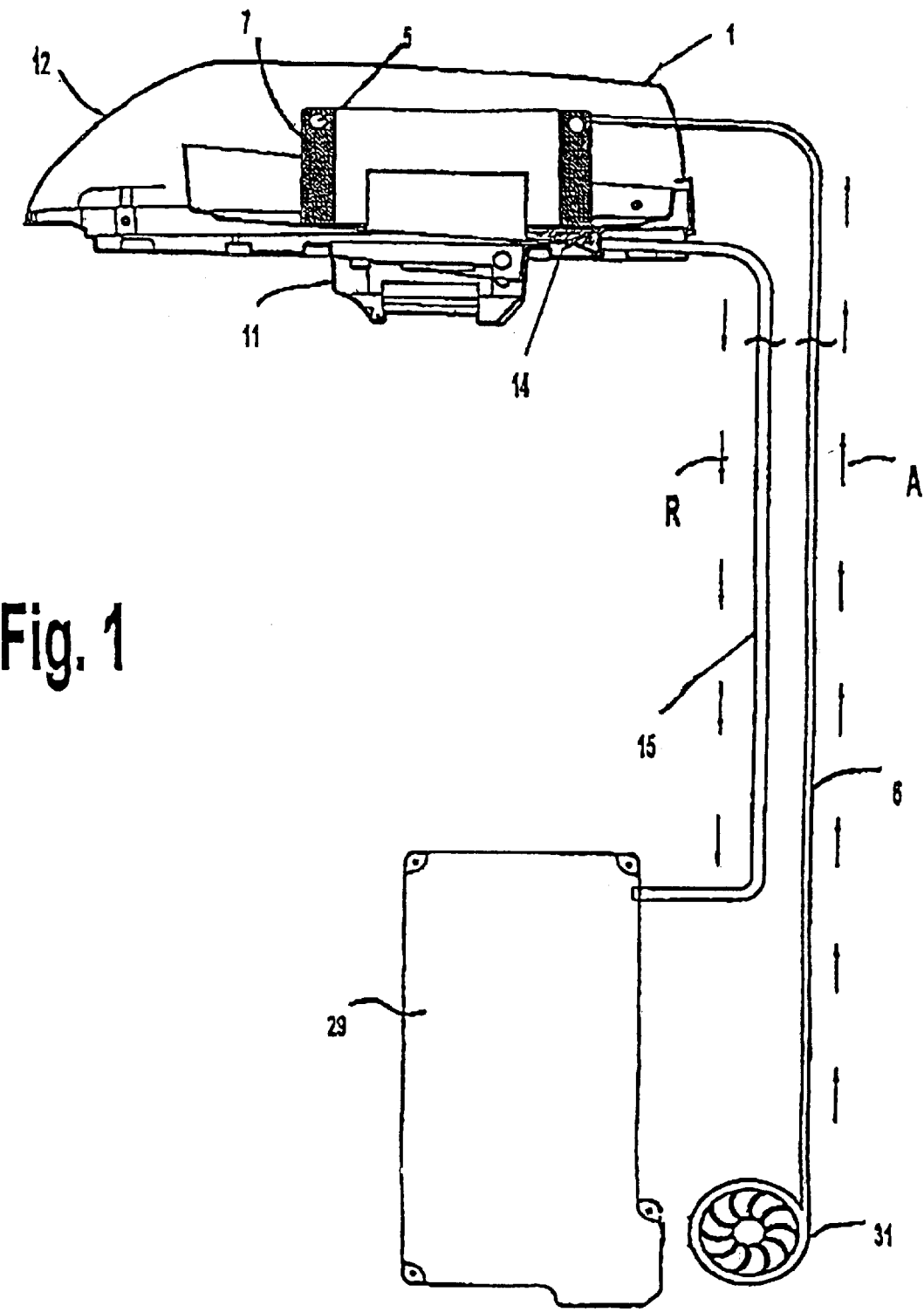
FIG. 1 is a schematically longitudinal section of a typical prior art cooler unit, as already described hereinbefore.
Figure 2:
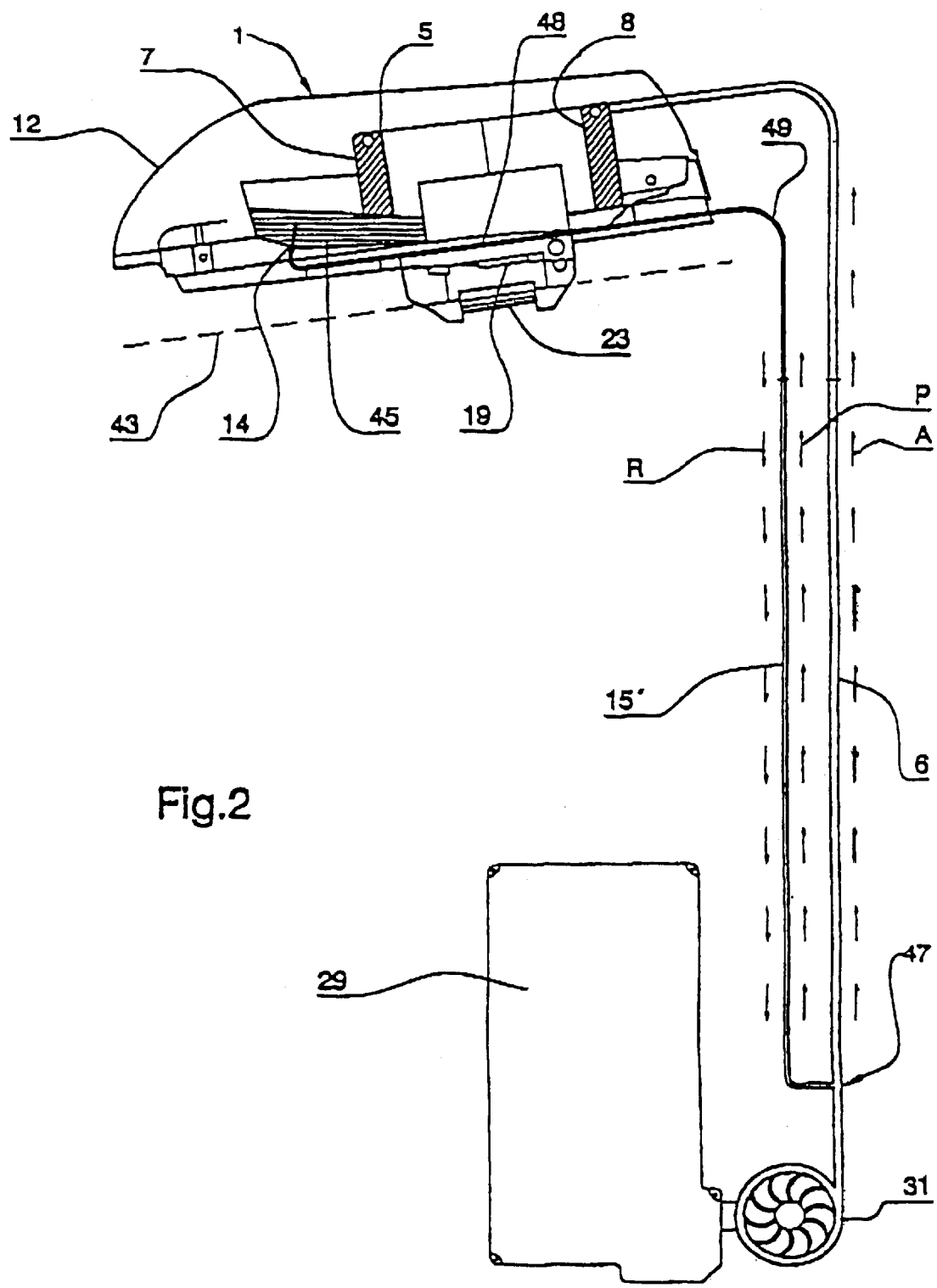
FIG. 2 is a schematically longitudinal section of a cooler, in accordance with a preferred embodiment of this invention.
Figure 3:
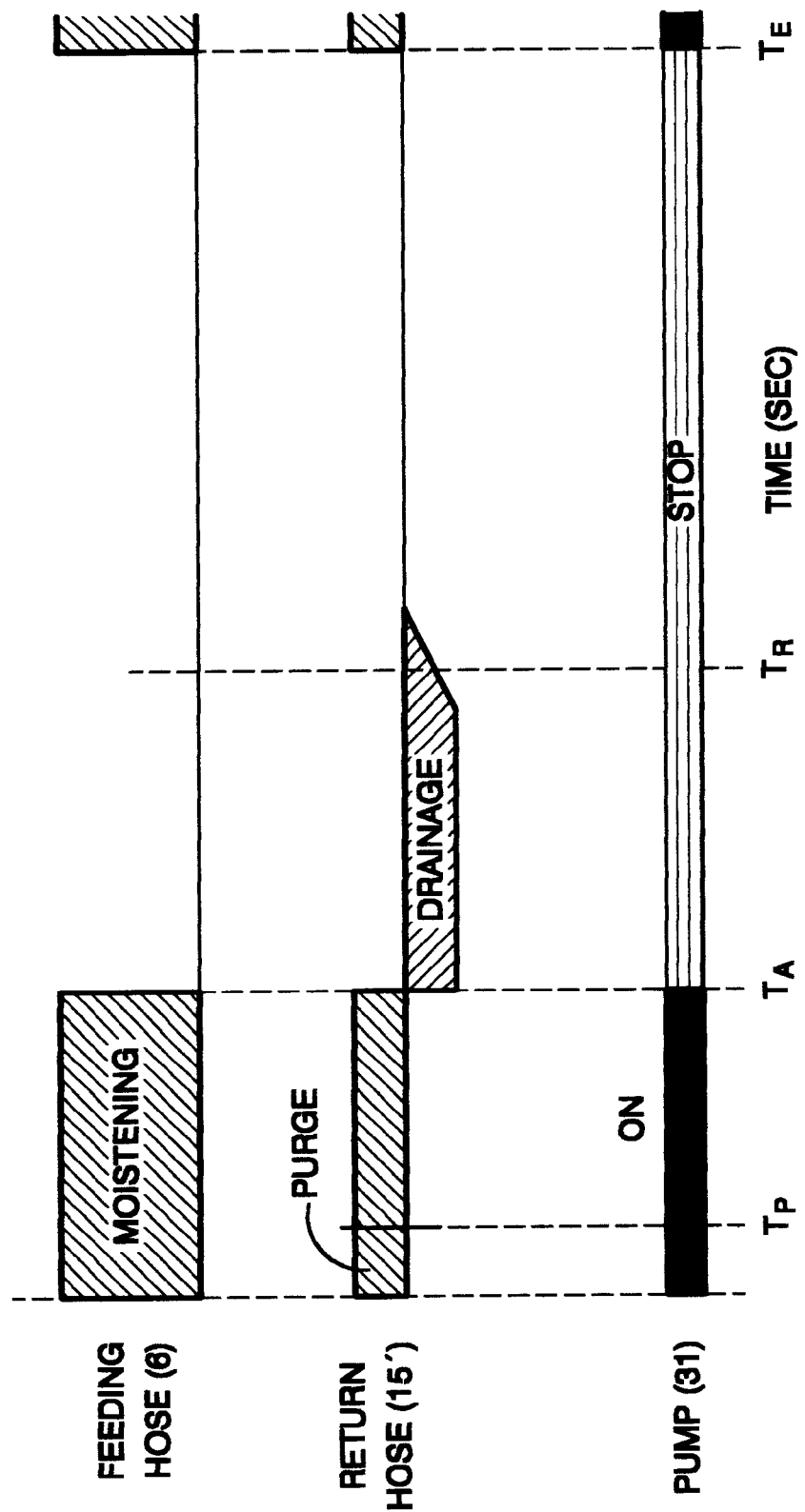
FIG. 3 is a time-graph describing the operation of the cooler of FIG. 2.

The aforementioned and other features and details of the cooler unit of this invention and the way in which it can be reduced to practice can be understood by means of the following detailed description, by way of example, of an embodiment that is illustrated in FIGS. 2 and 3.

The cooler represented in FIG. 2 is made up of a housing 1 provided with an air intake grid 12. The air is sucked in through a tubular evaporator 7, which can be for example cylindrical or quadrilateral, by means of a twin turbo electric fan 19. The side wall of the evaporator 7, which is preferably cylindrical, comprises wood shavings of adequate properties 8 or other porous material which can be moistened and which is kept moist by a coil 5 that has a plurality of orifices distributed on the perimeter of the evaporator 7. As the hot air passes through the moist porous wood material 8, water is evaporated therefrom into the air, which thus becomes cooled and moistened, that is to say conditioned or acclimated, as it comes out of a grid 23 with deflectors located in the roof of the cabin 43.

An external reservoir 29, preferably having a capacity of twenty-four liters and manufactured from a non-translucent material to avoid the formation of moss, feeds moistening water to the coil 5. The water is pumped through a hose 6 towards the top of the cooler housing 1 by means of a pump 31 coupled to one of the lower corners of the reservoir 29. A filter, having a surface of 250 cm$^2$ abutting against the internal apex formed by the three walls which externally house the pump 31, retains foreign particles and protects the mechanism of the pump 31.

The excess water from the evaporator 7 precipitates onto an annular tray or gutter 45 holding the evaporator 7 from where it is returned by the hose 15' to the reservoir 29. In accordance with this invention, the lower end of the of the excess water return hose 15' is connected to the outlet of the pump 31 together with the lower end of the coil feed hose 6. To this effect, a T-coupling 47 is connected to the outlet nipple of the pump 31, from where the two hoses 6 and 15' rise towards the cooler housing 1. The feed hose 6 of the evaporator 7 is connected, as in the conventional installation, to the distributor coil 5, while a return hose 15', preferably about ¼" in diameter, for example, has a generally vertical stretch which follows the feed hose 6 up to the housing 1, penetrating inside the housing 1, and a sloped stretch crossing the base of the housing 1 down to where its corresponding end is connected to a nipple 14 provided in the front part, that is to say, the lower level, of the collecting gutter or tray 45.

The pump 31 is intermittently operated in accordance with a predetermined duty cycle to maintain the porous material 8 of the evaporator sufficiently moist so that it "sweats" and so surrenders moisture continually to the flow of the incoming air. In one embodiment, the pump 31 operates automatically with on-cycles on the order of 35 seconds alternated with idle cycles of seven minutes, approximately.

During the on-cycle, the pump 31 starts up and pumps a greater flow of water up the feed hose 6 to the coil 5 (arrow A) so as to douse the evaporator 7, evenly moistening the porous element 8. At the same time, a smaller flow of water is pumped up the return hose 15' (arrow P), enough to completely purge it by the end of the on-cycle. At this moment, the pump 31 stops and the flow of water through both hoses 6 stops. The return hose 15' is now full of water and drains the collecting tray, coming over the rising stretch due to a siphon effect 48 extending towards the raised bend 49, caused by the forward inclination of the cooler's housing 1 in line with the roof of the cabin, and then dropping down (arrow R) to the reservoir 29, passing through the stopped pump 31.

The time-graph of FIG. 3 represents a working example of the cooler. The on-cycle TA during which the pump 31 is on is 36 seconds, during which time the water is pumped from the reservoir 29 by both hoses 6 and 15', in excess of a time Tp of 8 seconds which the return hose 15' requires to be purged. During this interval TA, the flow rate in the feeding hose 6 is between 1.4 and 1.0 cm$^3$/min, while the flow rate in the return hose 15' is correlatively between 0.4 and 0.9 cm$^3$/min (these measurements vary as a function of the diameter ratio between the feed and return hoses, as well as of the water head which was 1.8 meters for such measurements). Once the pump stops 31, the collecting tray 45 starts to drain for a time TR of 74 seconds, after which there is a relatively long idle time TE until the duty cycle starts again. Logically, the duration of these cycles as well as the duty ratio between the same can be adapted to different forms and times of operation, such as mean ambient temperature and fan 19 speed, among other factors.

The return hose 15' could have a smaller diameter than the feed hose 6 of the coil 5, for example from 4 to 8 mm in diameter, since the duty cycle imposed gives ample time for the gutter 45 to drain.

Nevertheless, in order to reduce the possibility of clogging with a smaller diameter, it is preferable to use hoses 6 and 15' of the same size, for example ½" in diameter, and incorporate a limiting valve 61 in the return hose 15' which would slow the water rising and enhance the descent of the water.

Various modifications, variations and/or additions can be made to the embodiment described herein, within the scope and spirit of the invention. For example, the coupling 47 does not have to be necessarily positioned at the outlet of the pump 31 itself, but could be positioned closer to the cooler housing 1, provided that it is positioned at a level sufficiently lower than the drain nipple 14 of the collecting tray 45. The proposed solution can be employed not only for forward inclination of the cooler with a return drain towards the rear, but can be adapted to any predetermined sloping of a cooler by positioning the return nipple 14 at the lower level of the excess water collecting means 45.

What is claimed is:

1. An air-cooler adapted for installation on a sloped roof-top, said cooler including:

a housing;

intake means for taking in air from outside the housing;

evaporator means for passing air from the intake means therethrough such that the air is acclimated;

a reservoir adapted for installation at a level lower than said evaporator means for supplying moistening liquid for said evaporator means;

a feed hose for administering said moistening liquid in said reservoir to said evaporator means;

pump means having an outlet connected to said feed hose for pumping said moistening liquid from said lower-level reservoir up to said evaporator means through said feed hose;

gutter means for collecting excess moistening liquid from said evaporator means; and a return hose for draining said excess moistening liquid from said gutter means, said return hose having an upper end for connection to said gutter means and a lower end;

wherein said return hose lower end is connected to said pump outlet and said pump means is driven intermittently with a predetermined duty cycle, whereby when said pump is on during said duty cycle a first flow of liquid rises up from said reservoir through said feed hose for moistening said evaporator means and a second flow of liquid rises up from said reservoir through said return hose for purging the return hose, and when said pump is off during said duty cycle said excess liquid drains down from said gutter means through said return hose and said pump means.

2. An air cooler in accordance with claim 1, wherein said return hose has a smaller diameter than said feed hose.

3. An air cooler in accordance with claim 1, wherein said return hose has a valve for limiting the rate of rising flow in said return hose relative to the drain rate therein.

4. An air cooler in accordance with claim 1, wherein said housing has an upper end and said gutter has a lower end across from and at a level lower than said housing upper end, and wherein said return hose enters said housing at its upper end and crosses down to the lower end front part of said gutter.

5. An air cooler in accordance with claim 1, wherein said return hose includes means for making said second flow smaller than said first flow and said drain rate.

6. An air cooler in accordance with claim 1, including coupling means for connecting said pump outlet to both said feed and return hoses.

7. A method for installing an air cooler on a sloped roof-top said cooler including intake means for taking in air from outside the housing, evaporator means for acclimating air passing therethrough from the intake means, a reservoir for installation at a level lower than said evaporator means for supplying moistening liquid for said evaporator means, a feed hose for administering said moistening liquid in said reservoir to said evaporator means, pump means having an outlet connected to said feed hose for pumping said moistening liquid from said lower-level reservoir up to said evaporator means through said feed hose for moistening said evaporator means, a gutter for collecting excess liquid from said evaporator means, and a return hose for draining said excess liquid from said gutter to said reservoir and having an upper end for connection to said gutter and a lower end, said gutter lying inclined atop said sloped roof-top so as to include an upper part and a lower part thereof; wherein said method comprises:

connecting the return hose between the lower part of the gutter and the outlet of the pump of the reservoir; and operating said pump intermittently to pump up a flow of said liquid through each of said hoses with a duty cycle dimensioned to purge said return hose in each cycle;

thereby upon idling said pump during the rest of said duty cycle a siphon effect is generated in said return hose to drain excess liquid in said gutter.

8. A method in accordance with claim 7, wherein the flow of moistening liquid through said feed hose is substantially greater than the flow of moistening liquid through said return hose during the duty cycle of said pump.

9. A method in accordance with claim 7, wherein the duty cycle of said pump is lower than 10%.

10. A method in accordance with claim 9, wherein said duty cycle is about 1:12.

11. A method in accordance with claim 7, wherein said return hose is installed with a stretch sloping across said gutter from the upper end thereof down to the lower end thereof.

* * * * *